(12) United States Patent
Takahashi

(10) Patent No.: US 11,165,290 B2
(45) Date of Patent: Nov. 2, 2021

(54) STATIONARY INDUCTION APPARATUS AND POWER CONVERTER USING SAME

(71) Applicant: Fuji Electric Co., Ltd., Kanagawa (JP)

(72) Inventor: Kiyoshi Takahashi, Kanagawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 470 days.

(21) Appl. No.: 16/056,047

(22) Filed: Aug. 6, 2018

(65) Prior Publication Data
US 2019/0103774 A1 Apr. 4, 2019

(30) Foreign Application Priority Data
Sep. 29, 2017 (JP) ............................ JP2017-190689

(51) Int. Cl.
| H01F 27/26 | (2006.01) |
| H02K 1/18 | (2006.01) |
| H01F 27/08 | (2006.01) |
| H02K 1/20 | (2006.01) |
| B60L 15/00 | (2006.01) |
| H01F 37/00 | (2006.01) |
| H02K 1/14 | (2006.01) |

(52) U.S. Cl.
CPC .............. H02K 1/18 (2013.01); B60L 15/007 (2013.01); H01F 27/085 (2013.01);
(Continued)

(58) Field of Classification Search
CPC ...... H01F 27/025; H01F 27/08; H01F 27/085; H01F 27/14; H01F 27/20; H01F 27/263;
(Continued)

(56) References Cited

U.S. PATENT DOCUMENTS

| 2008/0197961 A1* | 8/2008 | Patel ........................ H01F 27/29 336/170 |
| 2009/0206973 A1* | 8/2009 | Yabumi ..................... H01F 3/10 336/110 |

(Continued)

FOREIGN PATENT DOCUMENTS

| CN | 206022040 U | 3/2017 |
| JP | S56-2225 U | 1/1981 |

(Continued)

OTHER PUBLICATIONS

Japanese Office Action dated Jun. 15, 2021 in a counterpart Japanese patent application No. 2017-190689. (A machine translation (not reviewed for accuracy) attached.).

Primary Examiner — Tszfung J Chan
(74) Attorney, Agent, or Firm — Chen Yoshimura LLP

(57) ABSTRACT

A stationary induction apparatus includes a plurality of stationary device structures, each including: a stationary induction device including a core that has a plurality of magnetic legs and yokes connecting both ends of the plurality of magnetic legs, and windings that are respectively wound around the plurality of magnetic legs of the core; and a pair of yoke supports that respectively extend along the yokes on both ends of the stationary induction device and individually support the respective yokes; and a pair of connecting support members to which both ends of the pairs of yoke supports are respectively fixed such that the plurality of stationary device structures are arranged parallel to one another to form airflow paths between the respective stationary induction device that are disposed adjacent to each other.

5 Claims, 17 Drawing Sheets

(52) U.S. Cl.
CPC ......... *H01F 27/263* (2013.01); *H01F 27/266* (2013.01); *H01F 37/00* (2013.01); *H02K 1/146* (2013.01); *H02K 1/20* (2013.01); *B60L 2200/26* (2013.01); *B60L 2210/10* (2013.01)

(58) Field of Classification Search
CPC .... H01F 27/26; H01F 27/266; H01F 27/2876; H01F 27/30; H01F 27/306; H01F 2027/328; H01F 6/04; H01F 30/12; H01F 37/00; H02K 1/146; H02K 1/18; H02K 1/20; B60L 15/007; B60L 2210/10; B60L 2200/26
USPC .............. 336/5, 55, 57, 58, 59, 60, 197, 210
See application file for complete search history.

(56) References Cited

U.S. PATENT DOCUMENTS

| | | | | |
|---|---|---|---|---|
| 2013/0106547 | A1* | 5/2013 | Takahashi | H01F 27/306 336/60 |
| 2016/0027568 | A1 | 1/2016 | Takauchi et al. | |
| 2016/0056667 | A1* | 2/2016 | Konishi | H02J 9/062 307/66 |

FOREIGN PATENT DOCUMENTS

| | | | | |
|---|---|---|---|---|
| JP | 60088417 A | * | 5/1985 | ........... H01F 27/263 |
| JP | 63245912 A | * | 10/1988 | |
| JP | H2-8116 U | | 1/1990 | |
| JP | H4-8414 U | | 1/1992 | |
| JP | H5-13243 A | | 1/1993 | |
| JP | 06112052 A | * | 4/1994 | |
| JP | 2011071190 A | * | 4/2011 | |
| JP | 2012-212822 A | | 11/2012 | |
| JP | 2015032683 A | * | 2/2015 | |
| JP | 2017-38424 A | | 2/2017 | |
| KR | 20080007061 A | * | 1/2008 | |
| WO | WO-2014170978 A1 | * | 10/2014 | ............. H01F 27/06 |
| WO | 2015/008359 A1 | | 1/2015 | |

* cited by examiner

Front-Rear Direction of Vehicle Body

STATIONARY INDUCTION APPARATUS AND POWER CONVERTER USING SAME

BACKGROUND OF THE INVENTION

Technical Field

The present invention relates to a stationary induction apparatus and a power converter using the same to be installed in a railway vehicle, for example.

Background Art

Stationary induction apparatuses such as transformers and reactors are used as power converters to be mounted to the underfloor of an electric railway vehicle. One proposed example of such stationary induction apparatuses is the railway vehicle transformer disclosed in Patent Document 1, for example.

This railway vehicle transformer is mounted to the underfloor of an electric railway vehicle in a suspended manner and is configured having core-fastening fixtures which are arranged on the top surface of the main frame of a box frame suspended from the underfloor of the electric railway vehicle and used to fasten the transformer in place so that the tensile force due to the weight of the transformer itself is not applied to the mounting bolts.

Stationary induction apparatuses such as transformers and reactors to be installed in railway vehicles generate heat due to being supplied with high-voltage DC or AC and therefore require cooling.

One proposed example of a configuration for cooling such stationary induction apparatuses is the air-cooled reactor disclosed in Patent Document 2, for example.

In this air-cooled reactor, the heavy reactor is supported by the lower support structure members, and air vents for bringing in cooling airflow are formed in the support structure members in a manner corresponding to the internal gaps between windings in order to allow cooling airflow to flow from the lower side upwards.

RELATED ART DOCUMENTS

Patent Documents

Patent Document 1: Japanese Patent Application Laid-Open Publication No. H5-13243
Patent Document 2: WO 2015/008359

SUMMARY OF THE INVENTION

In the conventional technology disclosed in Patent Document 2, although cooling airflow is supplied to the windings via the air vents formed in the support structure members, there is a high degree of flow path resistance as the cooling airflow is passing through these air vents, and thus sufficient cooling airflow cannot be supplied to the windings, which results in a decrease in cooling efficiency.

The present invention was therefore made in view of the problems in the conventional technology described above and aims to provide a stationary induction apparatus which makes it possible to improve cooling efficiency, and a power converter using the same.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a stationary induction apparatus including: a plurality of stationary device structures, each including: a stationary induction device including: a core that has a plurality of magnetic legs and yokes connecting both ends of the plurality of magnetic legs, and windings that are respectively wound around the plurality of magnetic legs of the core; and a pair of yoke supports that respectively extend along the yokes on both ends of the stationary induction apparatus main unit and individually support the respective yokes; and a pair of connecting support members to which both ends of the pairs of yoke supports are respectively fixed such that the plurality of stationary device structures are arranged parallel to one another to form airflow paths between the respective stationary induction apparatus main units that are disposed adjacent to each other.

In another aspect, the present disclosure provides a power converter including the stationary induction apparatus configured as described above.

In this aspect of the present invention, the plurality of stationary device structures supporting the pairs of yoke supports extending along the yokes on both ends of the stationary induction devices are supported parallel to one another by the pair of connecting support members, with the airflow paths formed between the adjacent stationary induction devices. In this way, the pair of connecting support members do not obstruct the airflow paths, thereby making it possible to improve cooling efficiency.

Moreover, using this stationary induction apparatus with improved cooling efficiency in a power converter makes it possible to make the overall power converter smaller.

It is to be understood that both the foregoing general description and the following detailed description are exemplary and explanatory, and are intended to provide further explanation of the invention as claimed.

BRIEF DESCRIPTION OF THE DRAWINGS

FIG. 2A is a plan view in which a stationary induction apparatus compartment and an exhaust fan compartment are exposed, and FIG. 2B is a front view of the power converter according to the present invention.

DETAILED DESCRIPTION OF EMBODIMENTS

Next, an embodiment of a power converter according to the present invention will be described with reference to figures. Note that the figures are only schematic illustrations and may be different from the actual components. Moreover, the embodiment described below is only an example of a device or method for implementing the technical concepts of the present invention and does not limit the configuration of the invention to the configuration presented below. In other words, the technical concepts of the present invention allow for various modifications to be made within the technical scope defined by the claims.

First, one embodiment of a power converter according to the present invention will be described.

Figure 1:
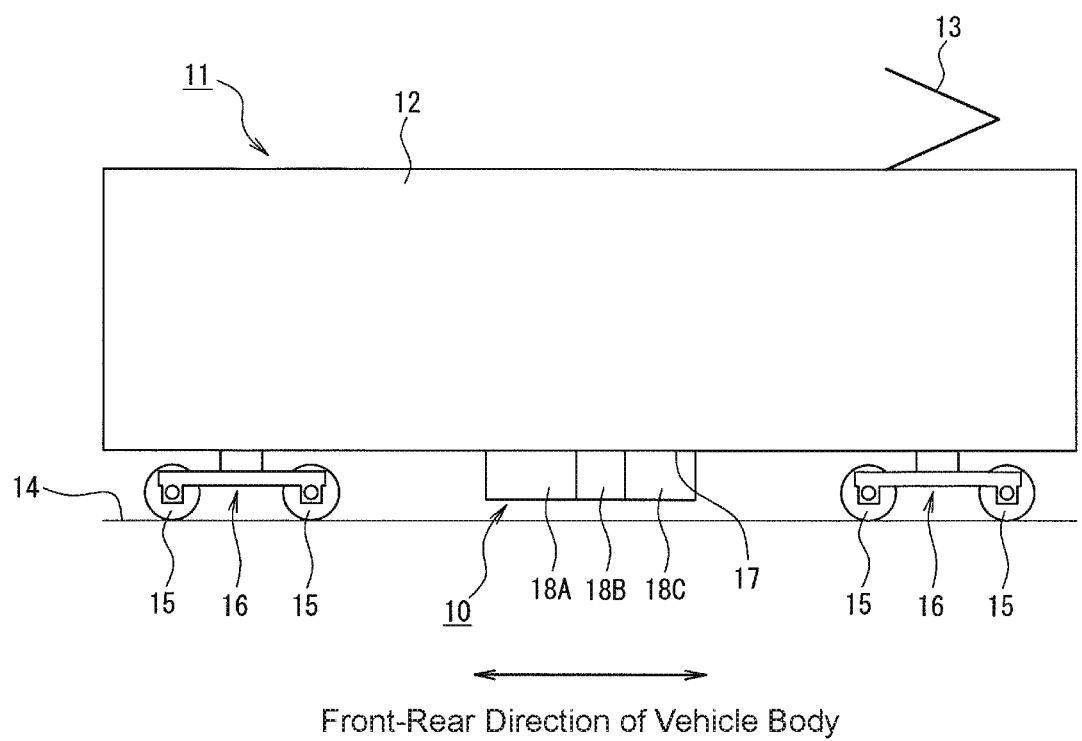
FIG. 1 is a side view illustrating a railway vehicle equipped with a power converter according to the present invention.

As illustrated in FIG. 1, in a railway vehicle 11 equipped with a power converter 10 according to the present invention, a pantograph 13 is installed on top of a vehicle body 12. Carts 16 which support wheels 15 respectively rotatably-contacting rails 14 on both lateral sides of the vehicle relative to the direction of travel are mounted on the underfloor of the vehicle body 12.

The power converter 10 is mounted in a suspended manner to a mounting portion 17 between the carts 16 on the underfloor of the vehicle body 12. This power converter 10 supplies electric power for use within the railway vehicle 11.

Figure 2A:
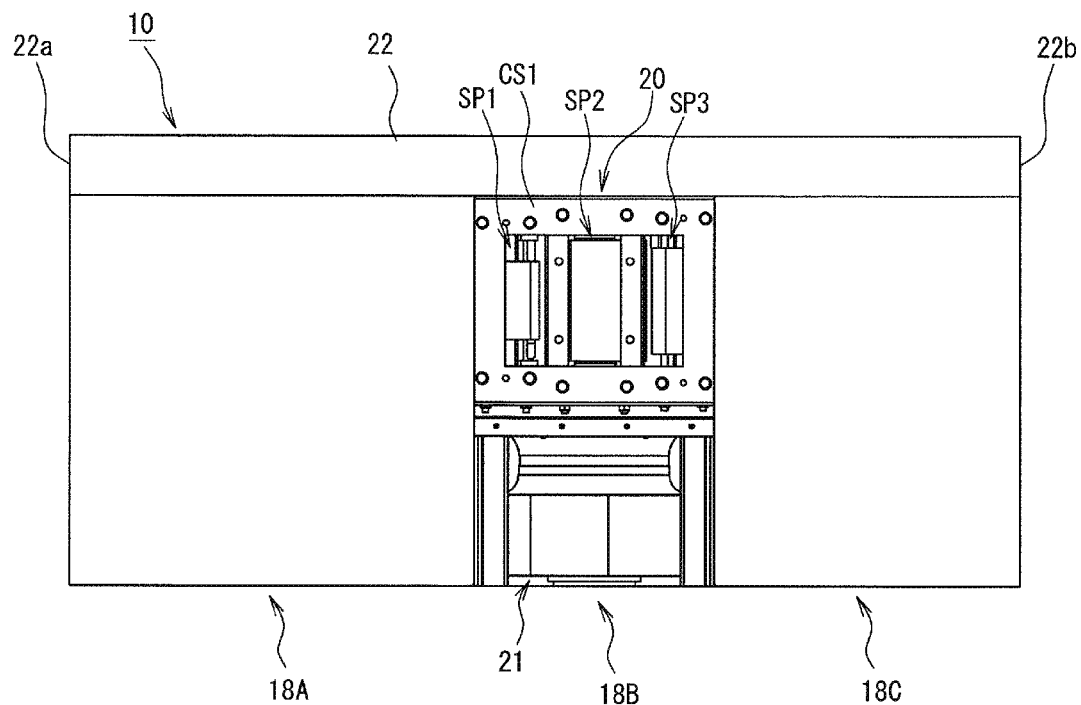
FIGS. 2A and 2B are views illustrating the overall configuration of the power converter according to the present invention, where
Figure 2B:
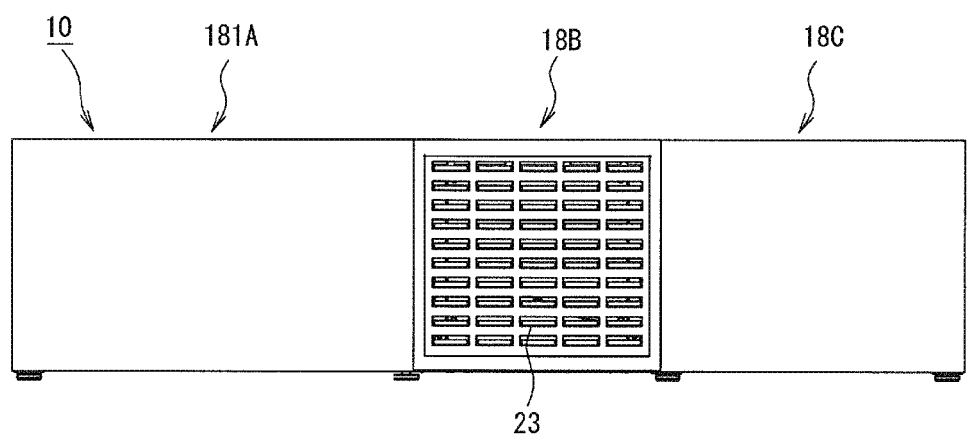

As illustrated in FIGS. 2A and 2B, the power converter 10 includes three enclosures connected together in the movement direction of the vehicle: a first enclosure 18A, a second enclosure 18B, and a third enclosure 18C. Here, assuming that the railway vehicle 11 is a DC electric train, the first enclosure 18A houses a step-up chopper for boosting a DC voltage supplied from the pantograph 13, as well as a resonant DC-DC converter, for example. The second enclosure 18B houses a stationary induction apparatus 20 such as a transformer or a reactor, and an exhaust fan 21 which exhausts outside air brought in as a cooling medium. The third enclosure 18C houses a three-phase inverter which converts the DC output from the resonant DC-DC converter to three-phase alternating current.

An air duct 22 is formed on the rear side of the first enclosure 18A, the second enclosure 18B, and the third enclosure 18C. Air intakes 22a and 22b are respectively formed on the first enclosure 18A-side end and the third enclosure 18C-side end of the air duct 22, and the air duct 22 is connected along the rear sides of the first enclosure 18A, the second enclosure 18B, and the third enclosure 18C. Thus, the exhaust fan 21 draws in outside air via the air intakes 22a and 22b. This outside air that has been drawn in travels along the air duct 22 to cool the first enclosure 18A and the third enclosure 18C and also cool the stationary induction apparatus 20 in the second enclosure 18B, and is then exhausted back outside via exhaust vents 23 formed in the front surface of the second enclosure 18B. In other words, in the second enclosure 18B, the exhaust fan 21 is arranged on the front side of the second enclosure 18B, and the stationary induction apparatus 20 is arranged on the rear side (the air duct 22 side).

Figure 3:
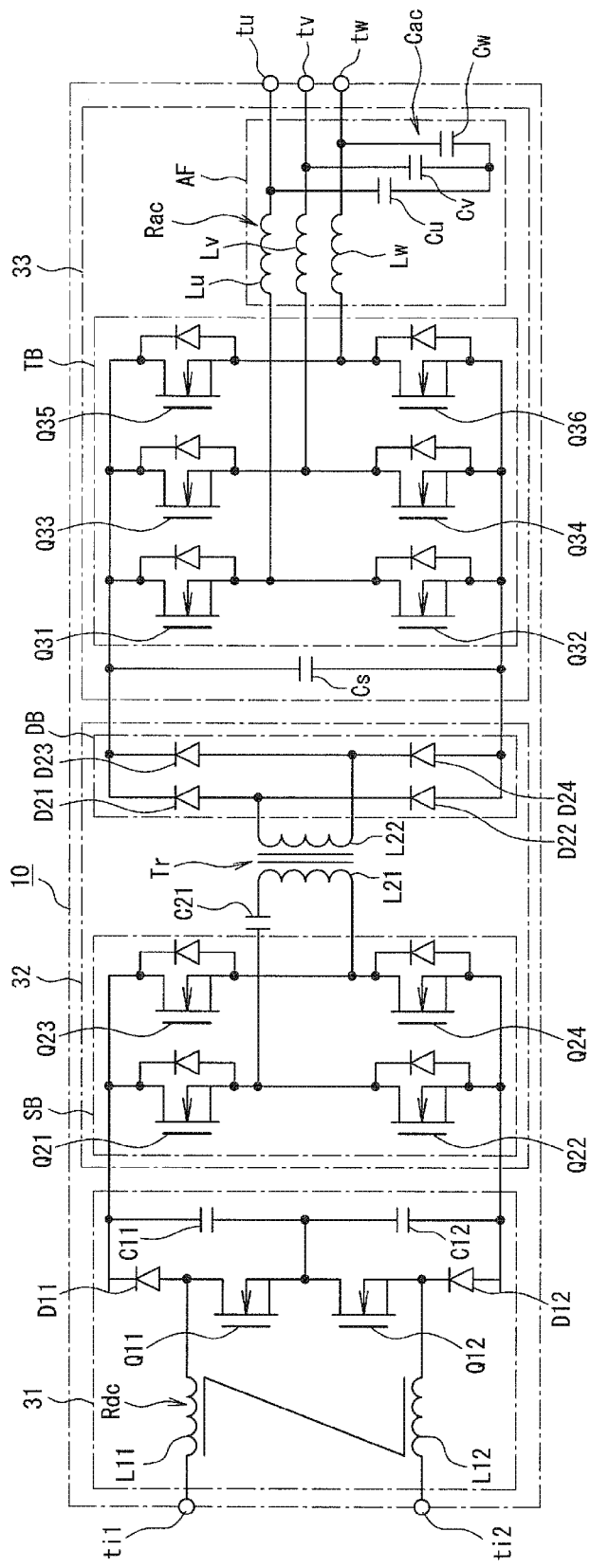
FIG. 3 is a circuit diagram illustrating an example of the power converter.

As illustrated in FIG. 3, the circuit configuration of the power converter 10 includes a step-up chopper 31, a resonant DC-DC converter 32, and a three-phase inverter 33.

The step-up chopper 31 has a three-level step-up chopper configuration. The step-up chopper 31 includes a DC reactor Rdc which takes as input a high DC voltage supplied from the pantograph 13, voltage-boosting switching devices Q11 and Q12, diodes D11 and D12, and capacitors C11 and C12.

The resonant DC-DC converter 32 includes a switching device bridge circuit SB including four switching devices Q21 to Q24, a high-frequency isolation transformer Tr, and a diode bridge circuit DB including four diodes D21 to D24.

In the switching device bridge circuit SB, the switching devices Q21 and Q22 are connected in series, and the switching devices Q23 and Q24 are connected in series. The high-voltage terminals of the switching devices Q21 and Q23 (which form a high-side arm) are connected to the positive electrode output side of the step-up chopper 31, and the low-voltage terminals of the switching devices Q22 and Q24 (which form a low-side arm) are connected to the negative electrode output side of the step-up chopper 31.

In the high-frequency isolation transformer Tr, one end of a primary winding L21 is connected to a node between the switching devices Q21 and Q22 via a capacitor C21, and the other end of the primary winding L21 is connected directly to the output terminals of the switching devices Q23 and Q24. Moreover, in a secondary winding L22 of the high-frequency isolation transformer Tr, one end is connected to a node between the diodes D21 and D22, and the other end is connected to a node between the diodes D23 and D24.

The three-phase inverter 33 includes a charge storage capacitor Cs, a three-phase bridge circuit TB including six switching devices Q31 to Q36, and an AC filter circuit AF. The charge storage capacitor Cs is connected between the positive electrode output side and the negative electrode output side of the resonant DC-DC converter 32. In the three-phase bridge circuit TB, a series circuit constituted by the switching devices Q31 and Q32, a series circuit constituted by the switching devices Q33 and Q34, and a series circuit constituted by the switching devices Q35 and Q36 are connected in parallel to the charge storage capacitor Cs.

The AC filter circuit AF includes a three-phase AC reactor Rac and an AC capacitor Cac. The three-phase AC reactor Rac includes three windings Lu, Lv, and Lw. The winding Lu is connected between an output terminal tu and a node between the switching devices Q31 and Q32. The winding Lv is connected between an output terminal tv and a node between the switching devices Q33 and Q34. The winding Lw is connected between an output terminal tw and a node between the switching devices Q35 and Q36.

The AC capacitor Cac includes three capacitors Cu, Cv, and Cw which are connected together on one end. The other end of the capacitor Cu is connected to between the winding Lu and the output terminal tu, the other end of the capacitor Cv is connected to between the winding Lv and the output terminal tv, and the other end of the capacitor Cw is connected to between the winding Lw and the output terminal tw.

Figure 4:
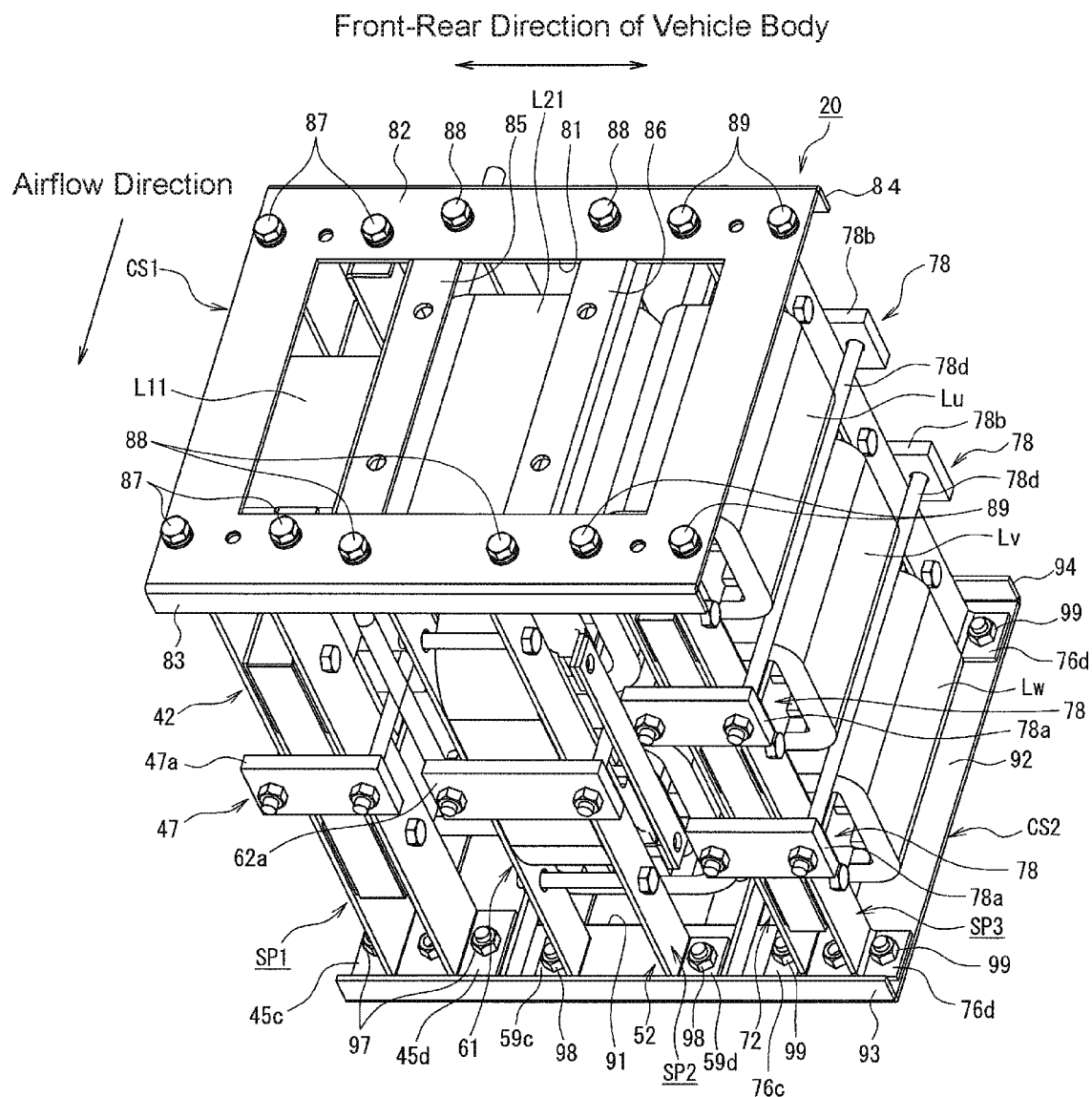
FIG. 4 is a perspective view illustrating the overall configuration of the stationary induction apparatus.

As illustrated in FIG. 4, in the stationary induction apparatus 20, the DC reactor Rdc of the step-up chopper 31, the high-frequency isolation transformer Tr of the resonant DC-DC converter 32, and the three-phase AC reactor Rac of the three-phase inverter 33 are housed together.

Figure 5:
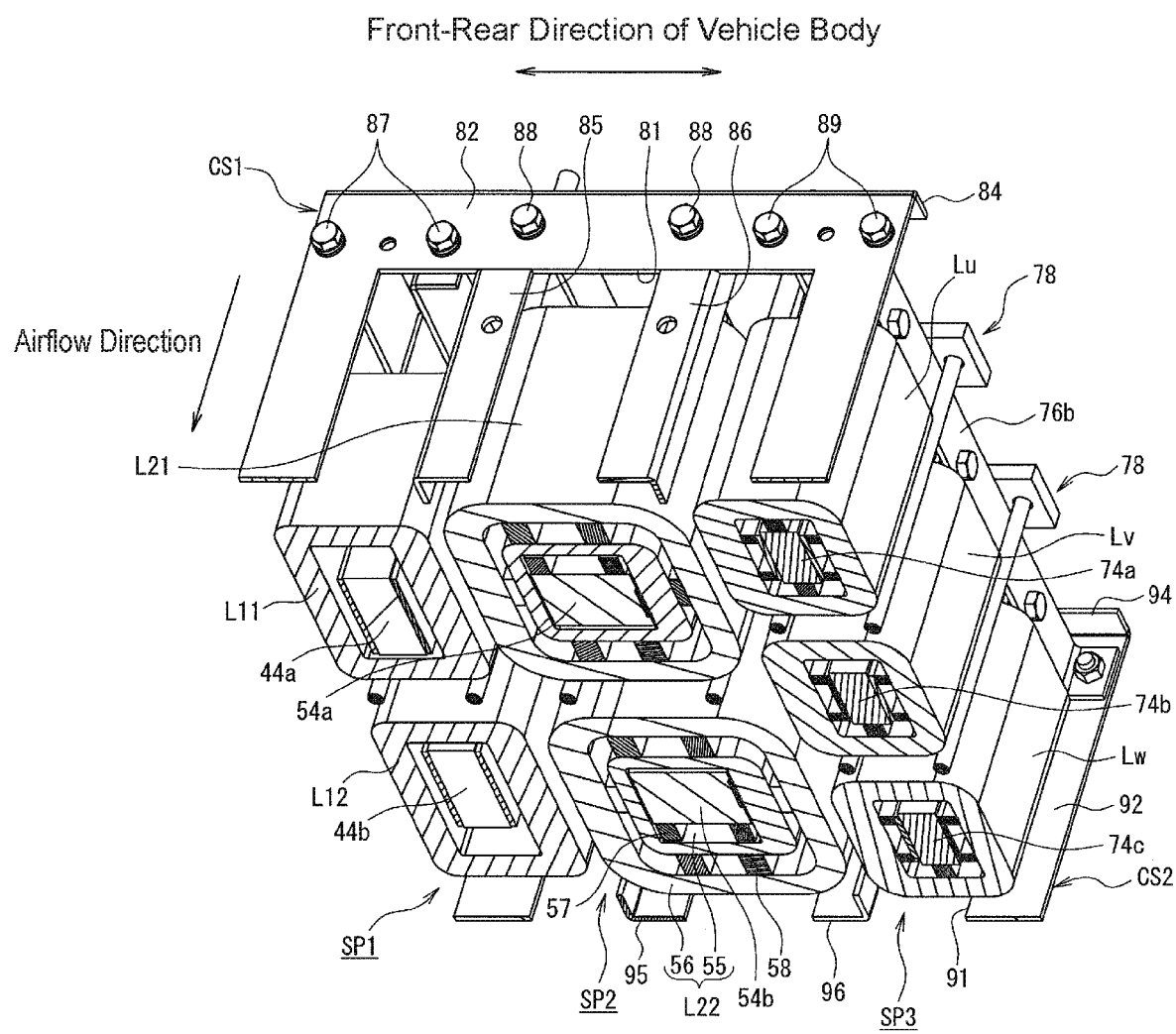
FIG. 5 is a perspective view illustrating a cross-section of the middle portion of the stationary induction apparatus illustrated in FIG. 4 as taken in the front-rear direction of the stationary induction apparatus.
Figure 6:
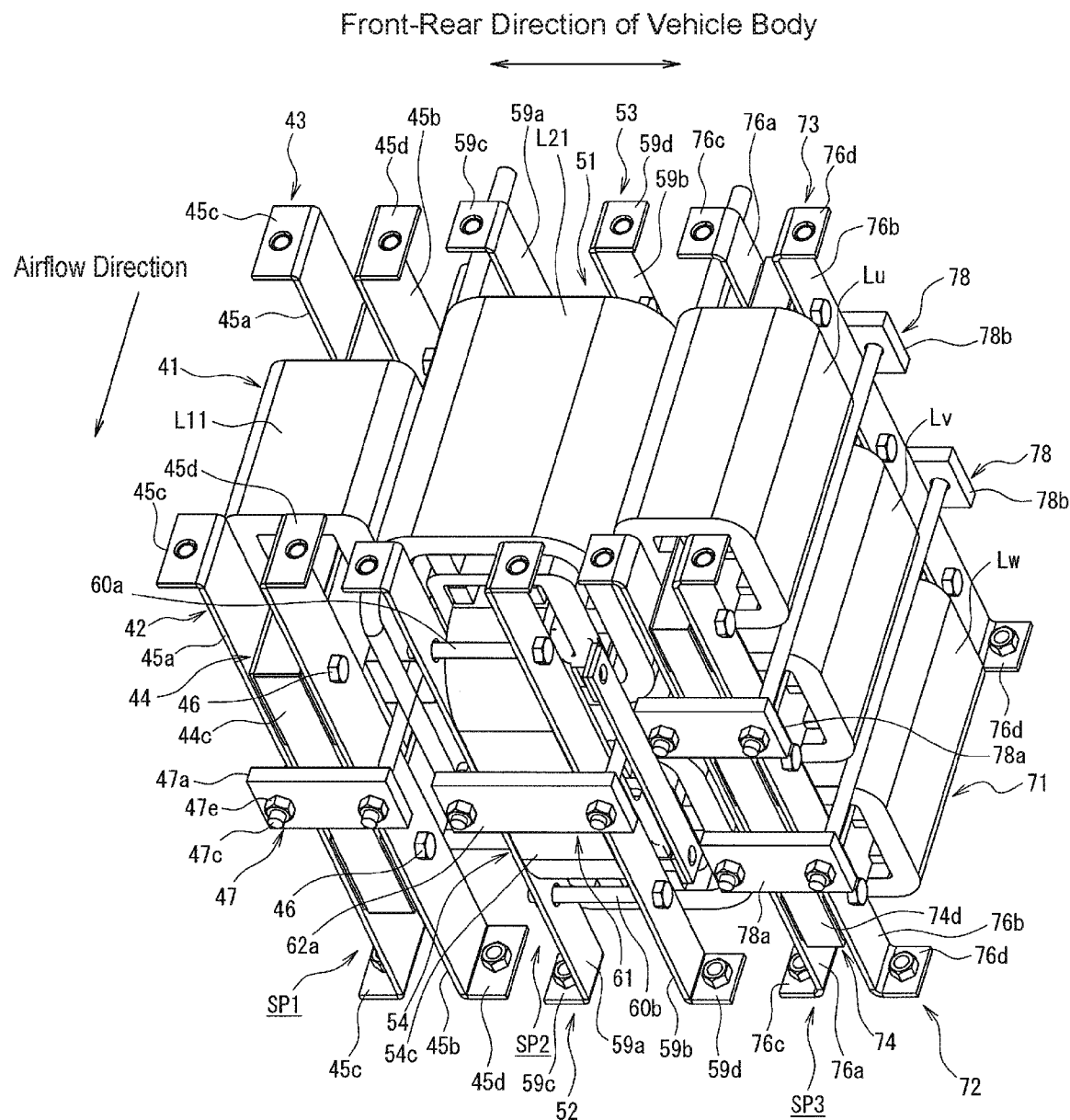
FIG. 6 is a perspective view of the configuration illustrated in FIG. 4 in a state in which upper and lower connecting support members have been removed.

As shown in FIGS. 4 to 6, the stationary induction apparatus 20 includes a first stationary device structure SP1 which supports the DC reactor Rdc, a second stationary device support SP2 which supports the high-frequency isolation transformer Tr, and a third stationary device structure SP3 which supports the three-phase AC reactor Rac.

Figure 10:
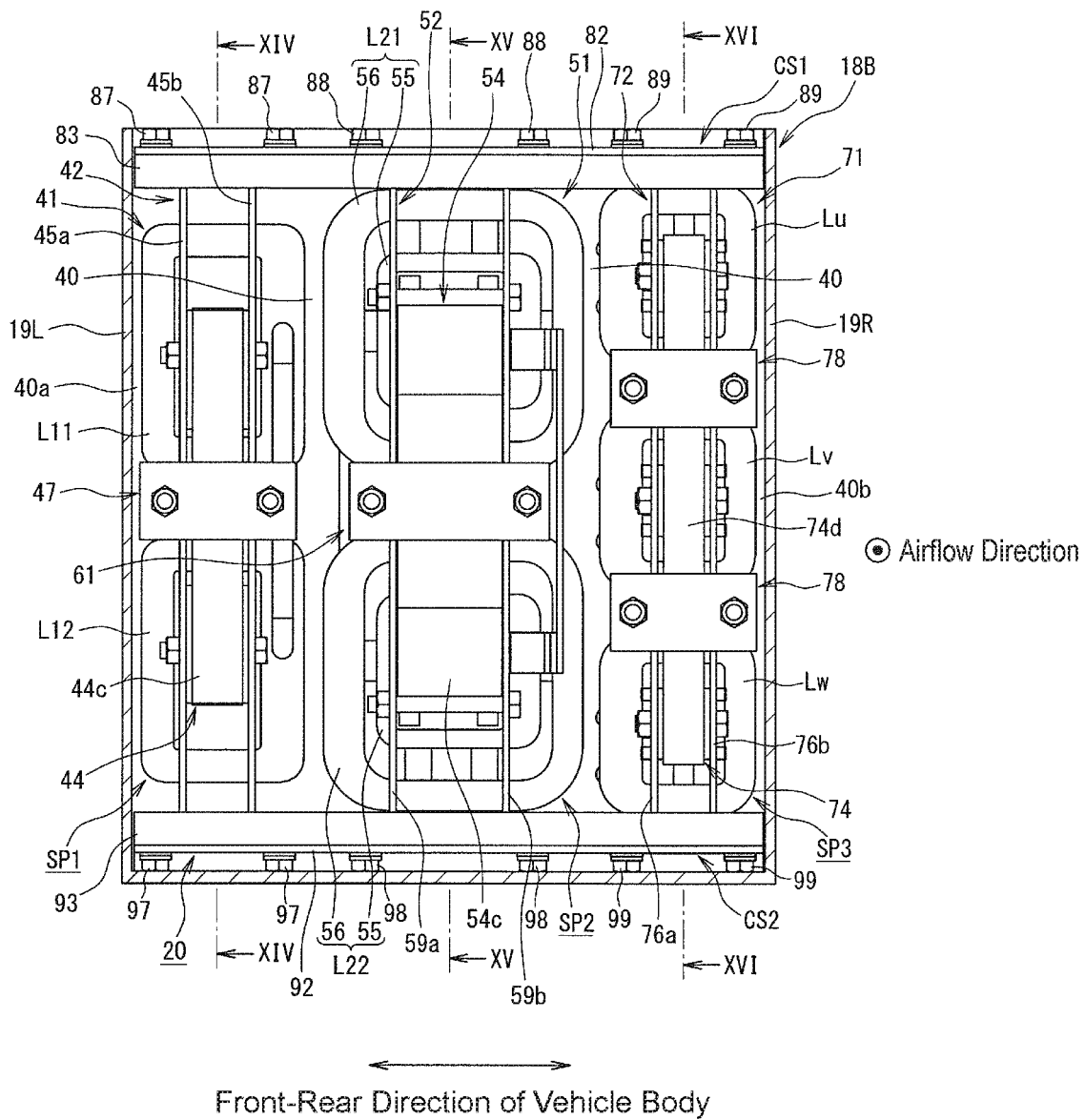
FIG. 10 is a front view illustrating the stationary induction apparatus which is housed in a second enclosure.
Figure 11A:
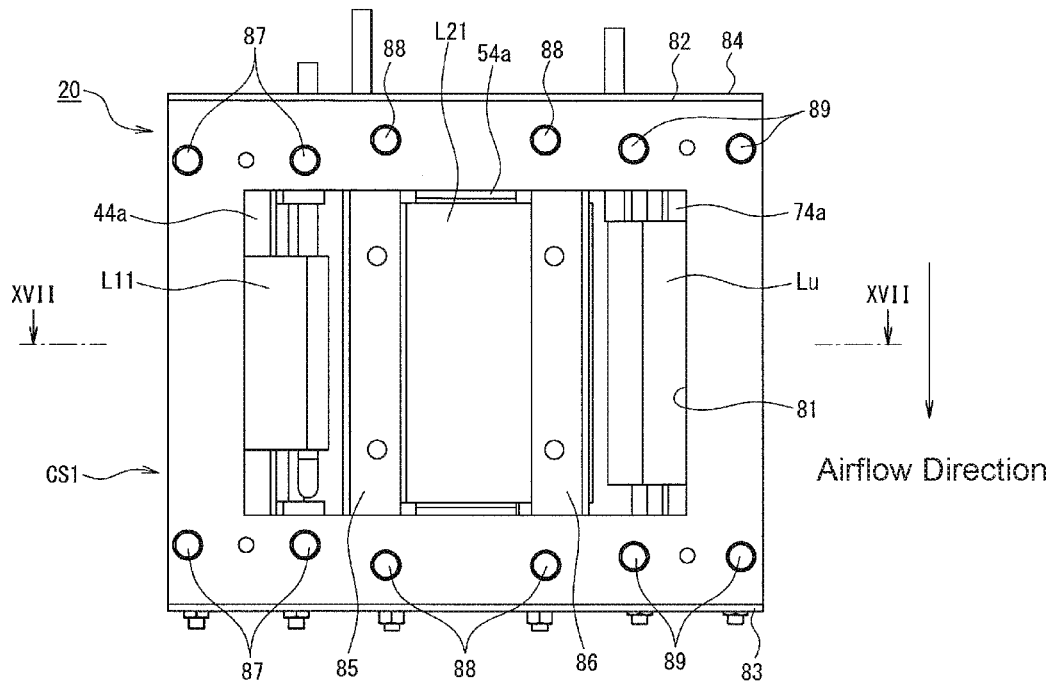
FIG. 11A is a plan view of the stationary induction apparatus and FIG. 11B is a bottom view of the stationary induction apparatus.
Figure 11B:
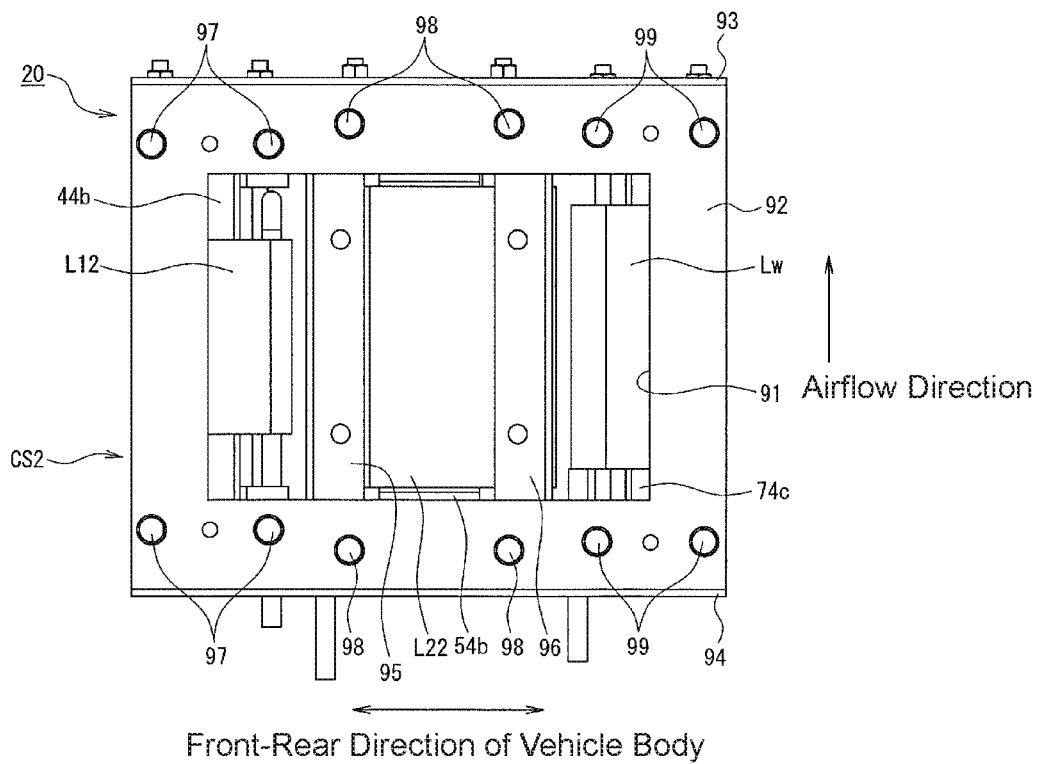
Figure 12:
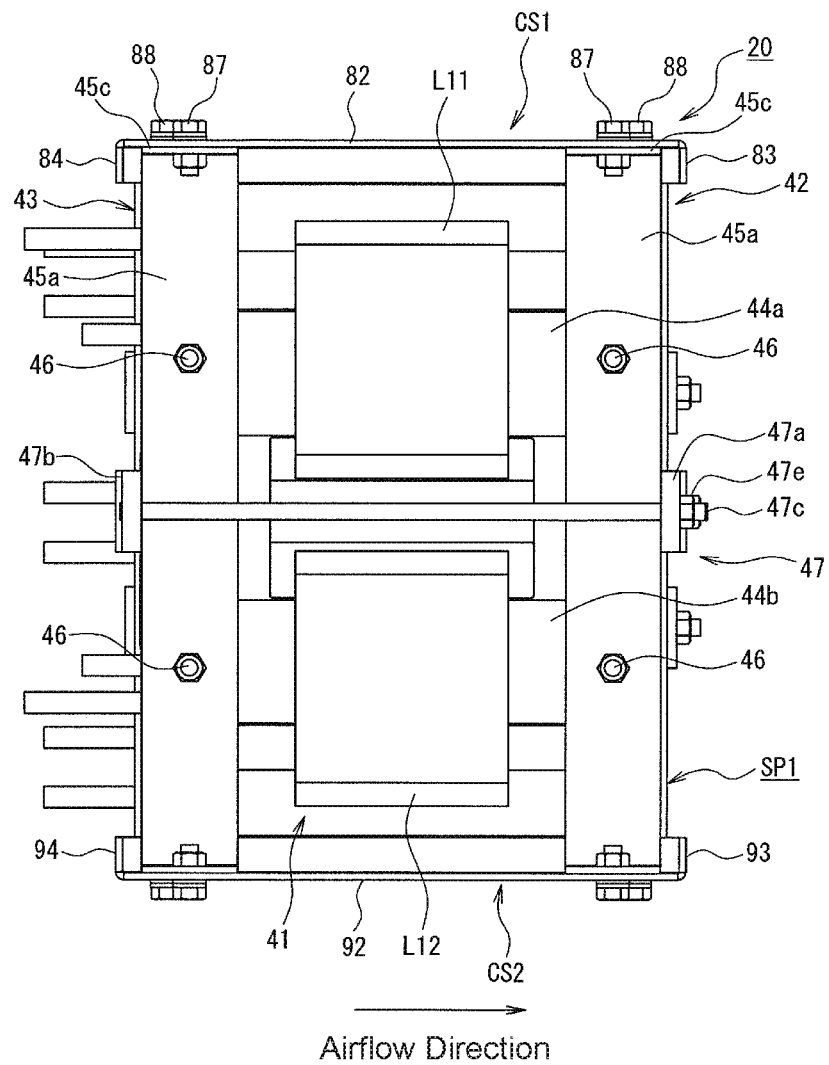
FIG. 12 is a left side view of the stationary induction apparatus.

As illustrated in FIG. 10, the first stationary device structure SP1, the second stationary device structure SP2, and the third stationary device structure SP3 are arranged parallel to one another in a line going in the front-rear direction of the vehicle body 12 (that is, the left-right direction of the power converter 10) with airflow paths 40 of a prescribed width formed therebetween. In other words, the airflow paths 40 are formed running in an airflow direction along both side faces of the second stationary device structure SP2. The upper and lower ends of each of the stationary device structures SP1 to SP3 are respectively fixed to a paired first connecting support member CS1 and second connecting support member CS2.

Figure 7:
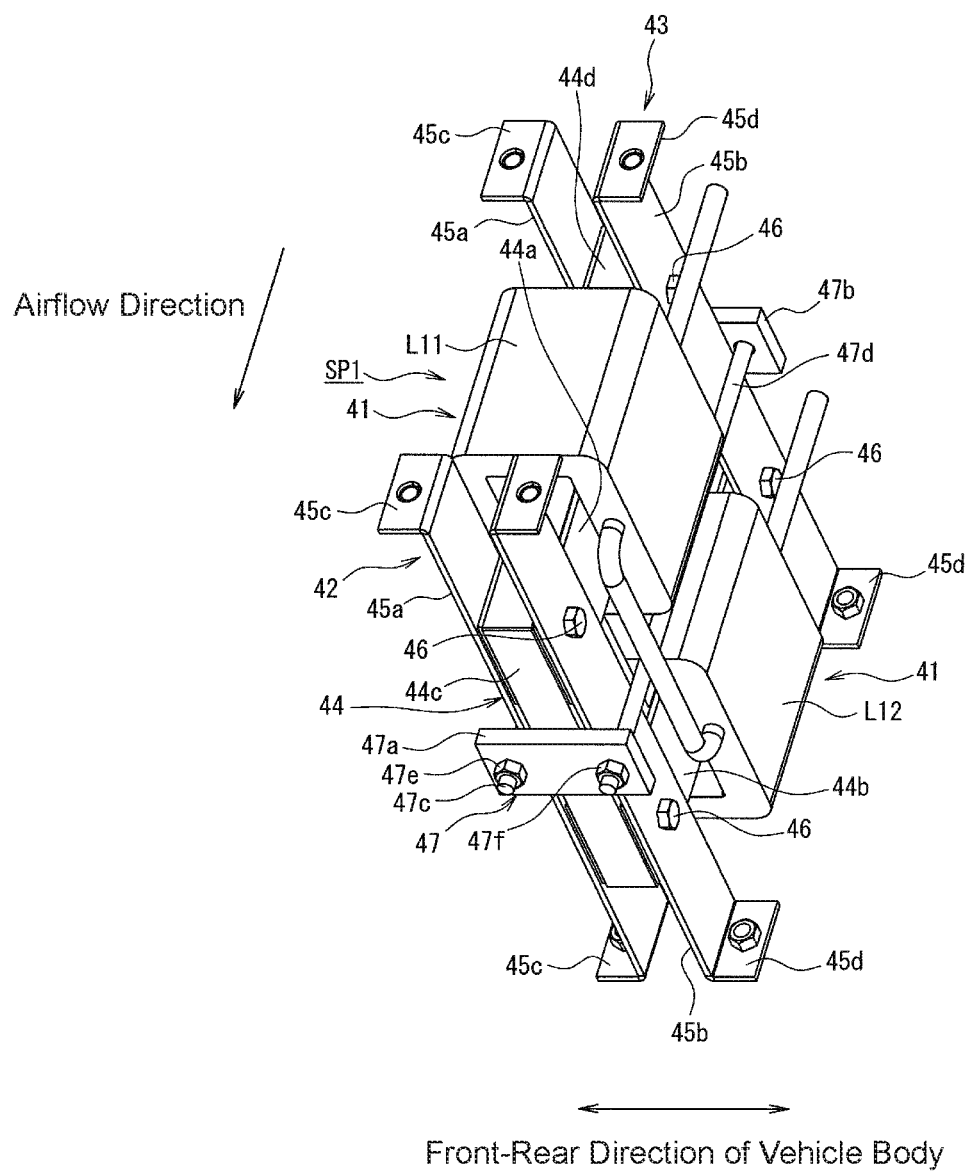
FIG. 7 is a perspective view of a first stationary induction device structure.

As illustrated in FIGS. 6 and 7, the first stationary device structure SP1 includes a stationary induction device 41 constituted by the DC reactor Rdc, and a front and rear pair of yoke supports 42 and 43 which support the stationary induction device 41.

Figure 14:
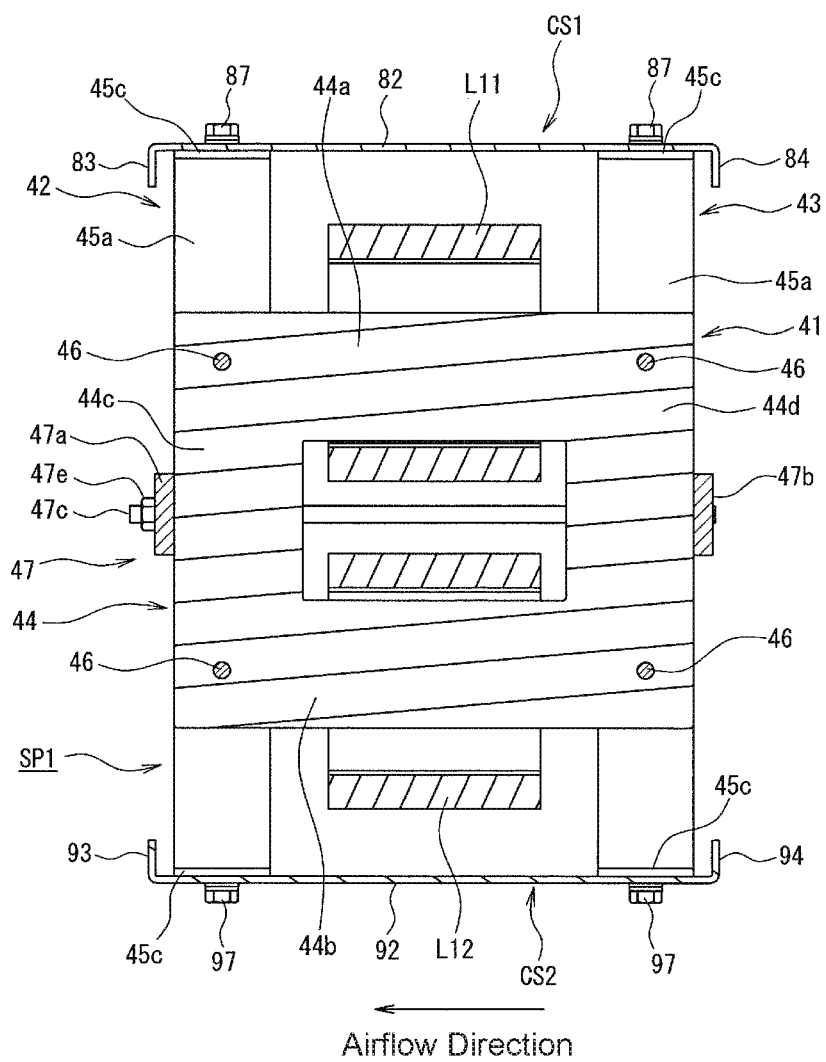
FIG. 14 is a cross-sectional view taken along line XIV-XIV in FIG. 10 and with the second enclosure removed.

As illustrated in FIGS. 7 and 14, the stationary induction device 41 includes a core 44 and windings L11 and L12 wound around this core 44. The core 44 is formed in a rectangular frame shape with two parallel magnetic legs 44a and 44b and yokes 44c and 44d. The magnetic legs 44a and 44b extend in the front-rear direction of the stationary induction apparatus 20 and are respectively wound by the windings L11 and L12. The yokes 44c and 44d individually connect the front and rear ends of the magnetic legs 44a and 44b.

As illustrated in FIG. 7, the yoke supports 42 and 43 respectively include a pair of left and right support plates 45a and 45b which individually support the opposing side faces of the yokes 44c and 44d of the core 44 of the stationary induction device 41, with the yokes 44c and 44d being arranged in a vertical orientation. These support plates 45a and 45b respectively extend in the direction in which the yokes 44c and 44d extend (that is, the direction orthogonal to the airflow direction of the airflow paths 40) and have an elongated plate shape with the surfaces thereof running parallel to the airflow paths 40 illustrated in FIG. 10.

Here, the upper ends of the support plates 45a and 45b extend upwards beyond the upper end of the winding L11, and the lower ends extend downwards beyond the lower end of the winding L12. The yokes 44c and 44d of the stationary induction device 41 are supported by being fastened to intermediate portions along the support plates 45a and 45b using fasteners 46 such as bolts and nuts. Moreover, attachment flanges 45c and 45d which are bent in the direction going away from the yokes 44c and 44d are respectively formed on the upper ends and lower ends of the support plates 45a and 45b.

Furthermore, on the outer sides of the yoke supports 42 and 43, a reinforcing frame 47 which provides additional support is arranged surrounding an intermediate portion of the support plates 45a and 45b. The reinforcing frame 47 includes a front and rear pair of rectangular plates 47a and 47b, two bolts 47c and 47d which are fixed to the rectangular plate 47b and extend to the rectangular plate 47a, and nuts 47e and 47f which are threaded onto the bolts 47c and 47d.

The rectangular plate 47a contacts the center portion (in the vertical direction) of the front end face of the yoke 44c and the center portion (in the vertical direction) of the front edges of the support plates 45a and 45b of the yoke support 42, thus covering the gap between the windings L11 and L12 when viewed in a front view. The rectangular plate 47a is longer than the width (distance) between the outer surfaces of the support plates 45a and 45b, has substantially the same width as the width of the windings L11 and L12, and has through holes (not illustrated in the figure) formed therein at a width equal to the gap between the outer surfaces of the support plates 45a and 45b.

The rectangular plate 47b contacts the center portion (in the vertical direction) of the rear end face of the yoke 44d and the center position (in the vertical direction) of the rear edges of the support plates 45a and 45b of the yoke support 43, thus covering the gap between the windings L11 and L12 when viewed in a rear view. The rectangular plate 47b is formed to have the same dimensions as the rectangular plate 47a, and the bolts 47c and 47d are fixed to the rectangular plate 47b at positions facing the through holes in the rectangular plate 47a.

The bolts 47c and 47d which are fixed to the rectangular plate 47b pass along the outer sides of the support plates 45a and 45b of the yoke supports 42, 43, go through the gap between the windings L11 and L12, and protrude out in the front direction from the through holes in the rectangular plate 47a. The nuts 47e and 47f are threaded and tightened onto the ends of the bolts 47c and 47d protruding out from the rectangular plate 47a. In this way, the rectangular plates 47a and 47b and the bolts 47c and 47d form a rectangular frame which surrounds and sandwiches the outer sides of the support plates 45a and 45b of the pair of yoke supports 42 and 43.

Figure 8:
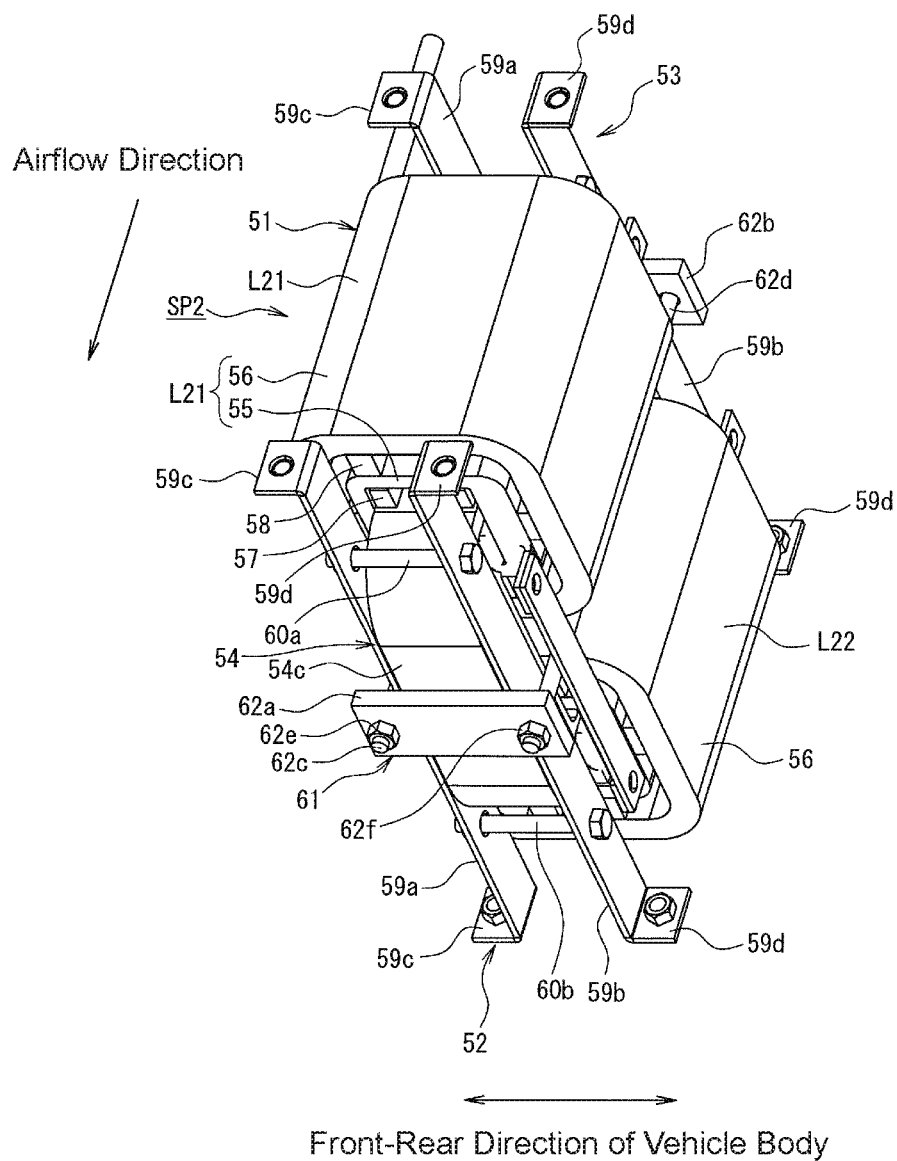
FIG. 8 is a perspective view of a second stationary induction device structure.

As illustrated in FIGS. 6 and 8, in the second stationary device structure SP2, a stationary induction device 51 constituted by the high-frequency isolation transformer Tr is supported by a front and rear pair of yoke supports 52 and 53. As illustrated in FIG. 8, the stationary induction device 51 includes a core 54 and the primary winding L21 and secondary winding L22, which are wound around this core 54. The core 54 is formed to have a square tube shape by layering amorphous magnetic ribbons, for example, and as illustrated in FIG. 15, the core 54 has a square frame shape overall including magnetic legs 54a and 54b which extend in the front-rear direction of the stationary induction apparatus 20 and yokes 54c and 54d which respectively connect the front and rear ends of the magnetic legs 54a and 54b.

Figure 15:
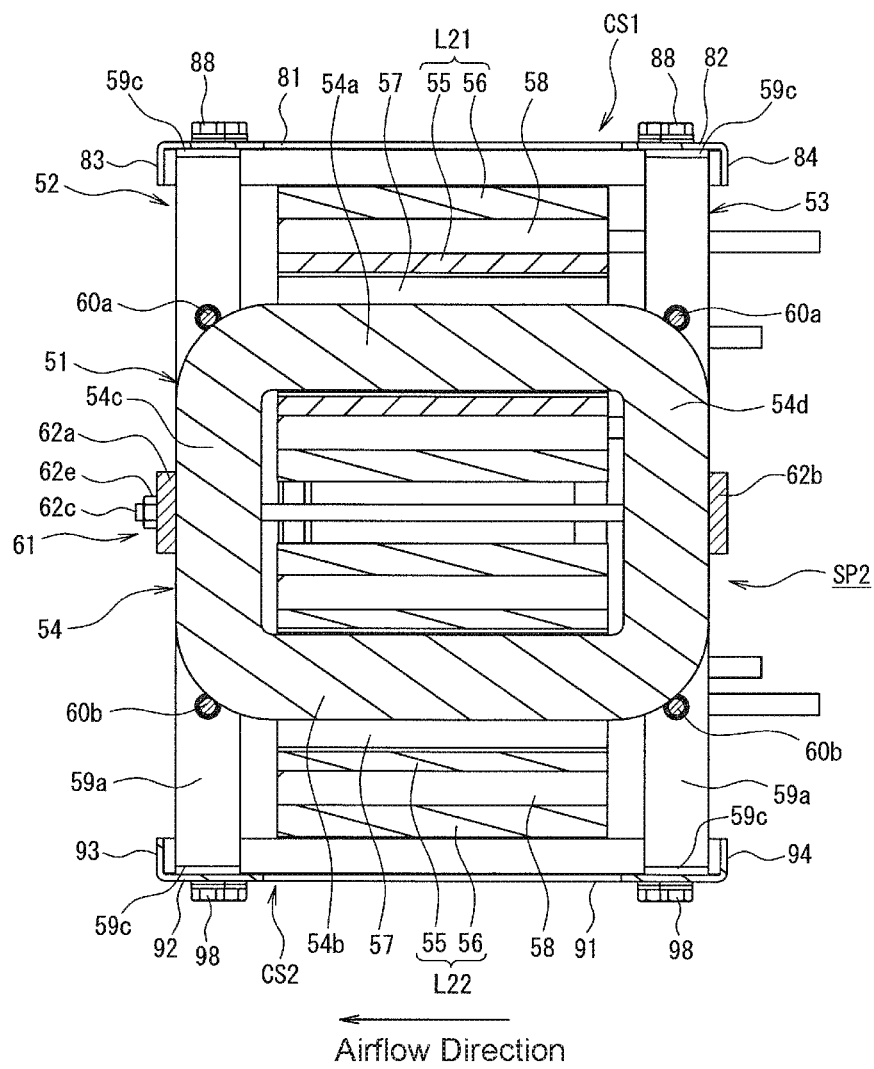
FIG. 15 is a cross-sectional view taken along line XV-XV in FIG. 10 and with the second enclosure removed.
Figure 17:
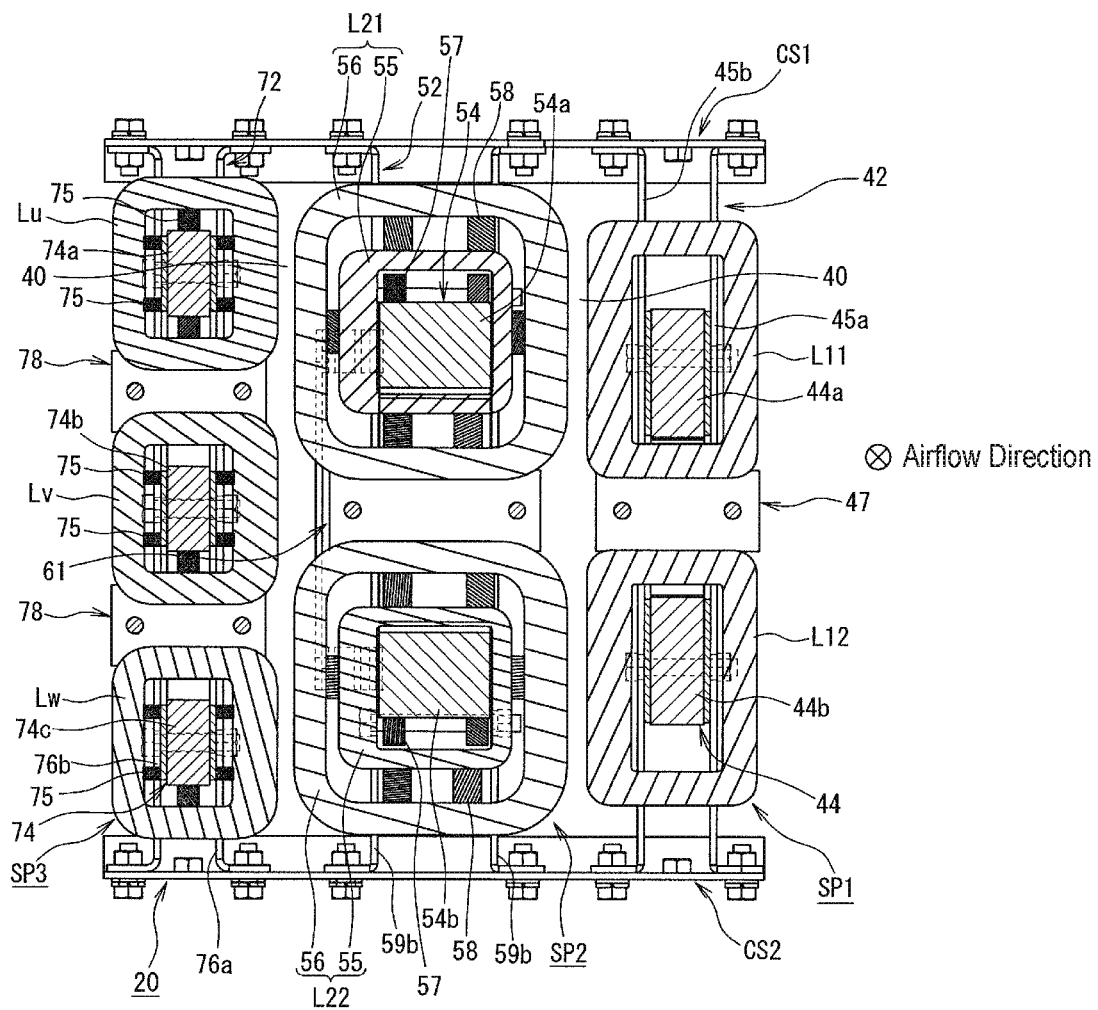
FIG. 17 is a cross-sectional view taken along line XVII-XVII in FIG. 11A.

As illustrated in FIGS. 5, 15, and 17, the primary winding L21 and the secondary winding L22 respectively include an inner winding 55 and an outer winding 56. spacers 57 are interposed between each inner winding 55 and the outer peripheral surface of the core 54, and spacers 58 are interposed between each inner winding 55 and outer winding 56.

As illustrated in FIG. 8, the yoke supports 52 and 53 respectively include a pair of support plates 59a and 59b which individually support the opposing side faces of the yokes 54c and 54d of the core 54 of the stationary induction device 51, with the yokes 54c and 54d being arranged in a vertical orientation.

These support plates 59a and 59b respectively extend in the direction in which the yokes 54c and 54d extend and have an elongated plate shape with the surfaces thereof running parallel to the airflow paths 40 illustrated in FIG. 10. The upper ends of the support plates 59a and 59b extend upwards beyond the upper end of the primary winding L21, and the lower ends extend downwards beyond the lower end of the secondary winding L22. The length of the support plates 59a and 59b is set to be the same as the length of the support plates 45a and 45b of the first stationary device structure SP1 described above.

As shown in FIGS. 8 and 15, upper and lower pairs of connecting bolts 60a and 60b which face or engage with arc-shaped outer peripheral surfaces of the yokes 54c and 54d of the stationary induction device 51 are arranged spanning at the intermediate portion between the support plates 59a and 59b. Nuts 60c and 60d are threaded onto the ends of the connecting bolts 60a and 60b. These nuts 60c and 60d are tightened to sandwich the yokes 54c and 54d of the stationary induction device 51 at the intermediate portions between the support plates 59a and 59b of the pair of yoke supports 52 and 53.

Moreover, attachment flanges 59c and 59d which are bent in the direction going away from the yokes 54c and 54d are respectively formed on the upper ends and lower ends of the support plates 59a and 59b.

In addition, a reinforcing frame 61 is arranged surrounding an intermediate portion of the support plates 59a and 59b of the pair of yoke supports 52 and 53. The reinforcing frame 61 includes a front and rear pair of rectangular plates 62a and 62b, bolts 62c and 62d which are fixed to the rectangular plate 62b and extend to the rectangular plate 62a, and nuts 62e and 62f which are threaded onto the bolts 62c and 62d. The rectangular plates 62a and 62b are arranged so as to cover, on the front and rear sides, the gap between the outer winding 56 of the primary winding L21 and the outer winding 56 of the secondary winding L22.

The bolts 62c and 62d which are fixed to the rectangular plate 62b pass between the primary winding L21 and the secondary winding L22 and protrude out in the front direction from through holes in the rectangular plate 62a. The nuts 62e and 62f are threaded and tightened onto the ends of the bolts 62c and 62d protruding out from the rectangular plate 62a. In this way, the rectangular plates 62a and 62b and the bolts 62c and 62d form a rectangular frame which surrounds and supports the outer sides of the support plates 59a and 59b of the pair of yoke supports 52 and 53.

Figure 9:
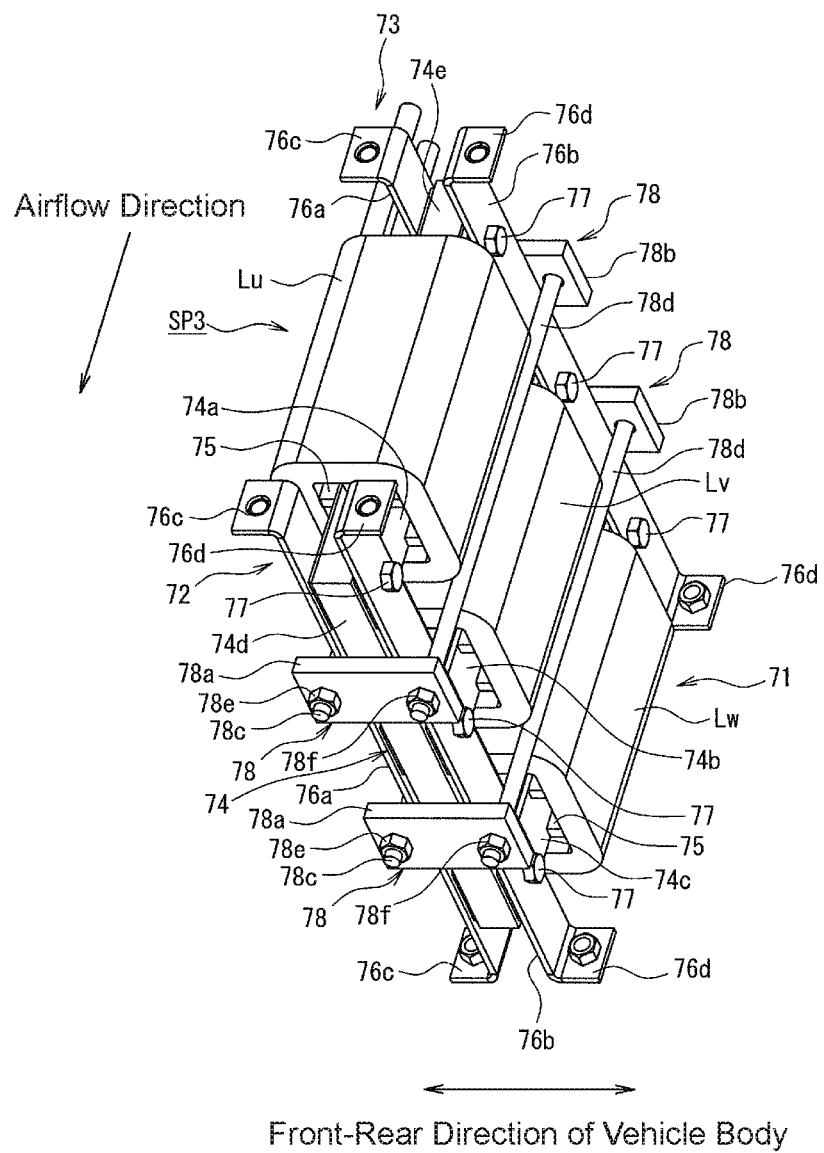
FIG. 9 is a perspective view of a third stationary induction device structure.

As illustrated in FIGS. 6 and 9, the third stationary device structure SP3 includes a stationary induction device 71 constituted by the three-phase AC reactor Rac and a front and rear pair of yoke supports 72 and 73 which support the stationary induction device 71.

Figure 16:
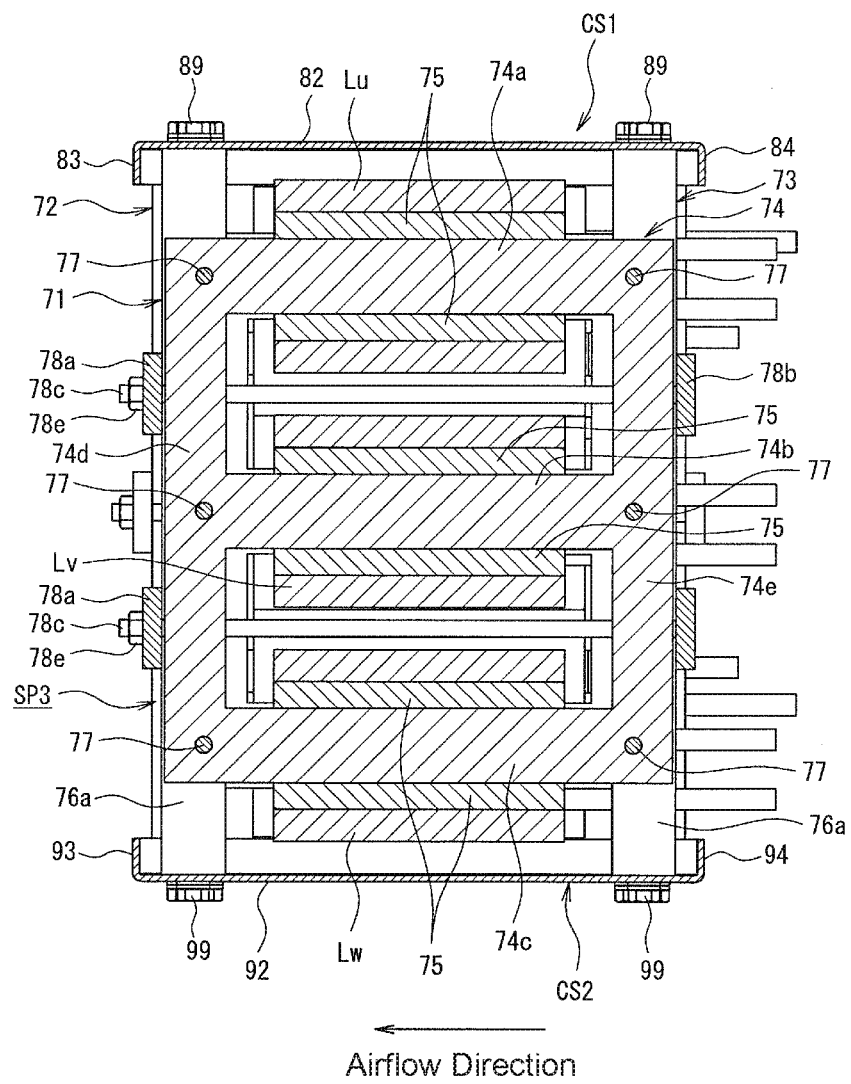
FIG. 16 is a cross-sectional view taken along line XVI-XVI in FIG. 10 and with the second enclosure removed.

As illustrated in FIGS. 9 and 16, the stationary induction device 71 includes a core 74 and the windings Lu, Lv, and Lw, which are wound around this core 74. The core 74 is formed in a rectangular frame shape with three parallel magnetic legs 74a, 74b, and 74c and yokes 74d and 74e. The magnetic legs 74a, 74b, and 74c extend in the front-rear direction of the stationary induction device 71 and are respectively wound by the Lu, Lv, and Lw. The yokes 74d and 74e individually connect the front and rear ends of the magnetic legs 74a, 74b, and 74c. Spacers 75 are respectively interposed between the magnetic legs 74a, 74b, and 74c of the core 74 and the windings Lu, Lv, and Lw.

As illustrated in FIG. 9, the yoke supports 72 and 73 respectively include a pair of support plates 76a and 76b which individually support the opposing side faces of the yokes 74d and 74e of the core 74 of the stationary induction device 71, with the yokes 74d and 74e being arranged in a vertical orientation. These support plates 76a and 76b respectively extend in the direction in which the yokes 74d and 74e extend (that is, the vertical direction orthogonal to the airflow direction of the airflow paths 40) and have an elongated plate shape with the surfaces thereof running parallel to the airflow paths 40. The length of the support plates 76a and 76b is set to be the same as the lengths of the support plates 45a and 45b of the first stationary device structure SP1 and the support plates 59a and 59b of the second stationary device structure SP2.

The yokes 74d and 74e of the stationary induction device 71 are supported by being fastened to intermediate portions along the support plates 76a and 76b using fasteners 77 such as bolts and nuts. Moreover, attachment flanges 76c and 76d which are bent in the direction going away from the yokes 74d and 74e are respectively formed on the upper ends and lower ends of the support plates 76a and 76b.

Furthermore, on the yoke supports 72 and 73, an upper and lower pair of reinforcing frames 78 are arranged surrounding intermediate portions of the support plates 76a and 76b. Each reinforcing frame 78 includes a front and rear pair of rectangular plates 78a and 78b, two connecting bolts 78c and 78d which are fixed to the rectangular plate 78b and extend to the rectangular plate 78a, and nuts 78e and 78f which are threaded onto the bolts 78c and 78d. The rectangular plates 78a and 78b are respectively arranged covering the space between the windings Lu and Lv and the space between the windings Lv and Lw.

The bolts 78c and 78d which are fixed to the rectangular plates 78b pass between the windings Lu and Lv and between the windings Lv and Lw and protrude out in the front direction from through holes in the rectangular plates 78a. The nuts 78e and 78f are threaded and tightened onto the ends of the bolts 78c and 78d protruding out from the rectangular plates 78a. In this way, the rectangular plates 78a and 78b and the bolts 78c and 78d form rectangular frames which surround and support the outer sides of the support plates 76a and 76b of the pair of yoke supports 72 and 73.

As illustrated in FIGS. 4, 11A, 11B, and 12, the upper ends of the first stationary device structure SP1, the second stationary device structure SP2, and the third stationary device structure SP3 are connected together and supported by the first connecting support member CS1. The first connecting support member CS1 includes an upper surface plate 82 with a rectangular window 81 formed in the center, bent portions 83 and 84 bent downwards from the front and rear edges of the upper surface plate 82, and connecting plates 85 and 86 connected between the front and rear edges of the rectangular window 81.

Moreover, the lower ends of the first stationary device structure SP1, the second stationary device structure SP2, and the third stationary device structure SP3 are connected together and supported by the second connecting support member CS2. The second connecting support member CS2 includes a lower surface plate 92 with a rectangular window 91 formed in the center, bent portions 93 and 94 bent upwards from the front and rear edges of the lower surface plate 92, and connecting plates 95 and 96 connected between the front and rear edges of the rectangular window 91.

Furthermore, as illustrated in FIG. 10, the first stationary device structure SP1, the second stationary device structure SP2, and the third stationary device structure SP3 are supported parallel to one another and in that order going from the left side on the bottom surface side of the upper surface plate 82, with the airflow paths 40 formed therebetween and having a gap sufficient to prevent heat interference from occurring between the windings. More specifically, the first stationary device structure SP1 is arranged near the left edge side of the upper surface plate 82, with the magnetic legs 44a and 44b of the core 44 of the stationary induction device 41 extending in the front-rear direction (airflow direction) of the second enclosure 18B (see FIGS. 4, 6, and 7). In this state, the attachment flanges 45c and 45d formed on one end of the support plates 45a and 45b of the yoke supports 42 and 43 are fixed to the upper surface plate 82 using fasteners 87 such as bolts and nuts, and the attachment flanges 45c and 45d on the other end are fixed to the lower surface plate 92 using fasteners 97 such as bolts and nuts (see FIGS. 4 and 12).

Similarly, the second stationary device structure SP2 is arranged near the center (in the left-right direction) of the upper surface plate 82, with the magnetic legs 54a and 54b of the core 54 of the stationary induction device 51 extending in the front-rear direction (airflow direction) of the second enclosure 18B (see FIGS. 4, 6, and 8). In this state, the attachment flanges 59c and 59d formed on one end of the support plates 59a and 59b of the yoke supports 52 and 53 are fixed to the upper surface plate 82 using fasteners 88 such as bolts and nuts, and the attachment flanges 59c and 59d on the other end are fixed to the lower surface plate 92 using fasteners 98 such as bolts and nuts (see FIGS. 4 and 15).

Figure 13:
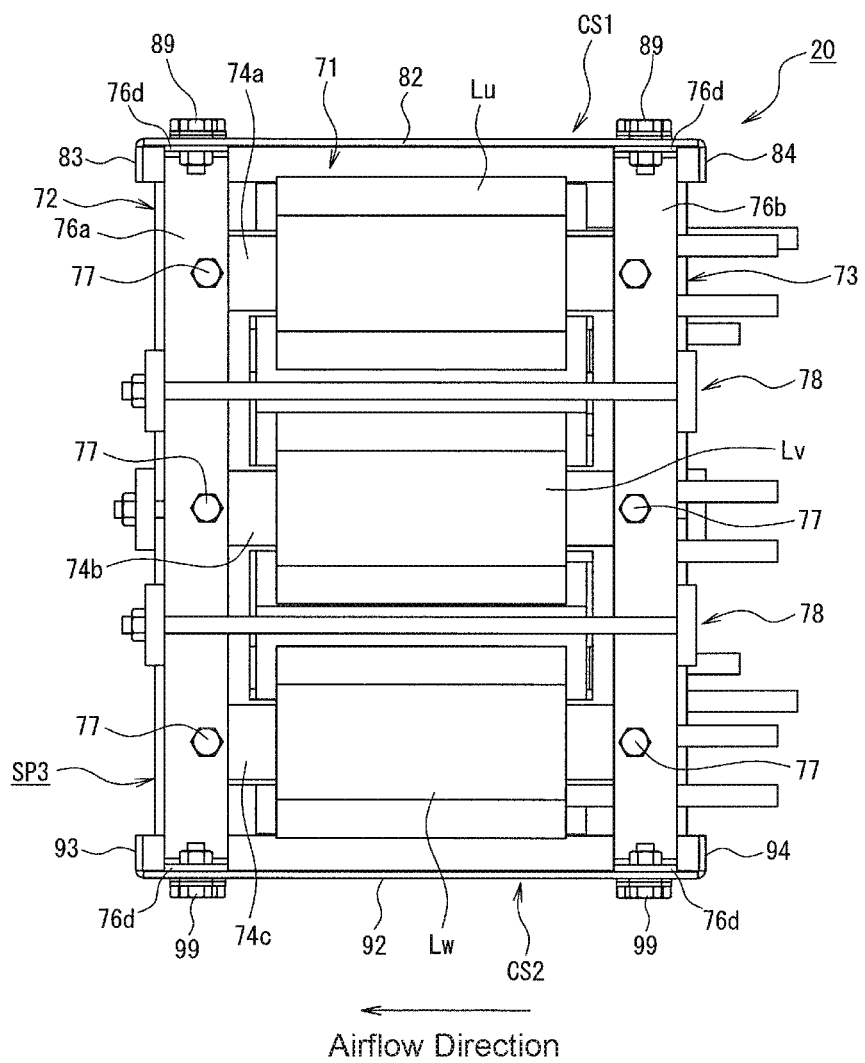
FIG. 13 is a right side view of the stationary induction apparatus.

Furthermore, the third stationary device structure SP3 is arranged near the right edge side of the upper surface plate 82, with the magnetic legs 74a to 74c of the core 74 of the stationary induction device 71 extending in the front-rear direction (airflow direction) of the second enclosure 18B (see FIGS. 4, 6, and 9). In this state, the attachment flanges 76c and 76d formed on one end of the support plates 76a and 76b of the yoke supports 72 and 73 are fixed to the upper surface plate 82 using fasteners 89 such as bolts and nuts, and the attachment flanges 76c and 76d on the other end are fixed to the lower surface plate 92 using fasteners 99 such as bolts and nuts (see FIGS. 4 and 13).

Here, the left end face of the upper surface plate 82 of the first connecting support member CS1 extends out beyond the left end faces of the windings L11 and L12 of the first stationary device structure SP1 by an amount equal to approximately one half of the width of the airflow paths 40 in the left-right direction. Similarly, the right end face of the upper surface plate 82 extends out beyond the right end faces of the windings Lu, Lv, and Lw of the third stationary device structure SP3 by an amount equal to approximately one half of the width of the airflow paths 40 in the left-right direction. Therefore, as illustrated in FIG. 10, when the stationary induction apparatus 20 is housed inside the second enclosure 18B, an airflow path 40a is formed between the windings L11 and L12 of the first stationary device structure SP1 and a left sidewall 19L of the second enclosure 18B. Similarly, an airflow path 40b is formed between the windings Lu, Lv, and Lw of the third stationary device structure SP3 and a right sidewall 19R of the second enclosure 18B.

Moreover, the left end face of the lower surface plate 92 of the second connecting support member CS2 extends out beyond the left end faces of the windings L11 and L12 of the first stationary device structure SP1 by an amount equal to approximately one half of the width of the airflow paths 40 in the left-right direction. Similarly, the right end face of the lower surface plate 92 extends out beyond the right end faces of the windings Lu, Lv, and Lw of the third stationary device structure SP3 by an amount equal to approximately one half of the width of the airflow paths 40 in the left-right direction.

Furthermore, as illustrated in FIG. 2A, the stationary induction apparatus 20 configured as described above is housed within the rear side of the second enclosure 18B of the power converter 10, with the first connecting support member CS1 arranged upwards and the second connecting support member CS2 arranged downwards within the second enclosure 18B, and the exhaust fan 21 is housed in front of the stationary induction apparatus 20.

Next, the operation of the power converter 10 described above will be described. The high DC voltage input from the pantograph 13 is input to an input terminal ti1 of the power converter 10 illustrated in FIG. 3, and an input terminal ti2 is connected via the wheels 15 to the rails 14 and is thereby connected to ground.

The high DC voltage input to the power converter 10 is stepped up by the step-up chopper 31, and then, with the input side and the output side isolated by the high-frequency isolation transformer Tr of the resonant DC-DC converter 32, this voltage is voltage-adjusted and supplied to the three-phase inverter 33. The direct current input to the three-phase inverter 33 is converted to three-phase alternating current and then output from the output terminals tu, tv and tw as a vehicle power supply.

In the power converter 10, during this power conversion process, heat is generated by the DC reactor Rdc of the step-up chopper 31, the high-frequency isolation transformer Tr of the resonant DC-DC converter 32, and the three-phase AC reactor Rac of the AC filter AF of the three-phase inverter 33. In particular, the DC reactor Rdc of the step-up chopper 31 experiences a large amount of current and therefore generates a large amount of heat.

Although arranging the DC reactor Rdc, the high-frequency isolation transformer Tr, and the three-phase AC reactor Rac (which constitute the stationary induction apparatus) separately from one another would disperse this heat generation, a separate cooling structure would be required for each stationary induction apparatus.

Therefore, grouping the DC reactor Rdc, the high-frequency isolation transformer Tr, and the three-phase AC reactor Rac together to form the stationary induction apparatus 20 as in the present embodiment allows a single cooling structure to be sufficient. Moreover, arranging this stationary induction apparatus 20 near the intake side (that is, the upstream side) of the exhaust fan 21 makes it possible to achieve sufficient cooling by using the outside air drawn in by the exhaust fan 21.

Meanwhile, electronic components such as the switching devices and capacitors of the step-up chopper 31, the resonant DC-DC converter 32, and the three-phase inverter 33 also generate heat.

Therefore, as shown in FIG. 2A, in the present embodiment, the air duct 22 having the air intakes 22a and 22b on either end is arranged on the rear side of the first enclosure 18A housing the step-up chopper 31 and the resonant DC-DC converter 32 and of the third enclosure 18C housing the three-phase inverter 33. This air duct 22 is connected along the first enclosure 18A, the second enclosure 18B, and the third enclosure 18C. As a result, outside air drawn in via the air intakes 22a and 22b by the exhaust fan 21 cools the step-up chopper 31, the resonant DC-DC converter 32, and the three-phase inverter 33 and then passes through the stationary induction apparatus 20 from the rear side to the front side to be exhausted via the exhaust vent 23.

Here, in the stationary induction apparatus 20, the DC reactor Rdc constituting the stationary induction device 41 is supported by the first stationary device structure SP1. Similarly, the high-frequency isolation transformer Tr constituting the stationary induction device 51 is supported by the second stationary device structure SP2. Furthermore, the three-phase AC reactor Rac constituting the stationary induction device 71 is supported by the third stationary device structure SP3.

Moreover, as illustrated in FIG. 10, the first stationary device structure SP1, the second stationary device structure SP2, and the third stationary device structure SP3 are supported parallel to one another between the first connecting support member CS1 and the second connecting support member CS2 so as to form the airflow paths 40 between the windings adjacent to one another in the left-right direction. In addition, the airflow path 40a is formed between the windings L11 and L12 of the first stationary device structure SP1 and the left sidewall 19L of the second enclosure 18B, and the airflow path 40b is formed between the windings Lu, Lv, and Lw of the third stationary device structure SP3 and the right sidewall 19R of the second enclosure 18B.

Therefore, the airflow paths 40, 40a, and 40b are formed around the DC reactor Rdc, the high-frequency isolation transformer Tr, and the three-phase AC reactor Rac. As a result, sufficient cooling of the DC reactor Rdc, the high-frequency isolation transformer Tr, and the three-phase AC reactor Rac can be achieved by cooling airflow traveling from the rear side to the front side through these airflow paths 40, 40a, and 40b. Here, the first connecting support member CS1 and the second connecting support member CS2 are arranged running parallel to the airflow paths 40, 40a, and 40b and therefore do not obstruct the cooling airflow.

Moreover, in the first stationary device structure SP1, the yokes 44c and 44d of the core 44 of the stationary induction device 41 are supported by the yoke supports 42 and 43. Similarly, in the second stationary device structure SP2, the yokes 54c and 54d of the core 54 of the stationary induction device 51 are supported by the yoke supports 52 and 53. Furthermore, in the third stationary device structure SP3, the yokes 74d and 74e of the core 74 of the stationary induction device 71 are supported by the yoke supports 72 and 73.

In addition, the support plates 45a and 45b, 59a and 59b, and 76a and 76b of the yoke supports 42 and 43, 52 and 53, and 72 and 73 are arranged with the surfaces thereof running parallel to the airflow direction of the cooling airflow traveling through the airflow paths 40. Therefore, the support plates 45a and 45b, 59a and 59b, and 76a and 76b exhibit substantially no resistance to the cooling airflow and make it possible to reduce flow path resistance and to thereby reduce pressure loss. This, in turn, makes it possible to improve cooling of the stationary induction devices 41, 51, and 71.

Furthermore, in the DC reactor Rdc, the high-frequency isolation transformer Tr, and the three-phase AC reactor Rac, spacers are used to create gaps between the core 44 and the windings L11 and L12, between the core 54 and the windings L21 and L22, and between the core 74 and the windings Lu, Lv, and Lw. The cooling airflow also passes through these gaps, thereby making it possible to further improve the cooling effect.

Here, although widening the gaps between the first stationary device structure SP1, the second stationary device structure SP2, and the third stationary device structure SP3 further reduces flow path resistance and thereby increases the amount of airflow and improves cooling efficiency, this also increases the size of the overall stationary induction apparatus 20. Therefore, it is preferable that the gaps be set to the minimum distance that makes it possible to achieve the necessary cooling effect.

In addition, the narrow first stationary device structure SP1 supporting the DC reactor Rdc and the narrow third stationary device structure SP3 supporting the three-phase AC reactor Rac are arranged on either side of the wide second stationary device structure SP2 supporting the high-frequency isolation transformer Tr. Therefore, the airflow paths 40 are substantially symmetric in the left-right direction, thereby making it possible to achieve uniform cooling without the cooling airflow being biased towards either side. Here, giving the front face of the stationary induction apparatus 20 an approximately square shape and substantially aligning the center of the stationary induction apparatus 20 with the center axis of the exhaust fan 21 makes it possible to achieve more uniform cooling.

Furthermore, in the first stationary device structure SP1, the second stationary device structure SP2, and the third stationary device structure SP3, the rectangular plates 47a, 47b, 62a, 62b, 78a, and 78b of the reinforcing frames are arranged between the upper and lower windings. Therefore, these rectangular plates 47a, 47b, 62a, 62b, 78a, and 78b act as baffle plates, thereby inducing turbulence and making it possible to improve the cooling effect as well as making it possible to equalize the flow rate of cooling airflow traveling through the airflow paths 40, 40a, and 40b. In this sense, it is preferable that reinforcing frames also be arranged in the gaps between the winding L11 of the first stationary device structure SP1 and the first connecting support member CS1 and between the winding L12 and the second connecting support member CS2. As an alternative to such reinforcing frames, cover plates which cover the gaps near the first connecting support member CS1 and the second connecting support member CS2 may be used.

In the embodiment above, the cores 44, 54, and 74 of the stationary induction devices 41, 51, and 71 were described as being arranged so as to lie within the vertical plane. However, the present invention is not limited to the configuration described above and, the cores 44, 54, and 74 of the stationary induction devices 41, 51, and 71 in FIG. 16 may be rotated by 90° so as to be positioned within the horizontal plane.

Moreover, in the embodiment above, the pairs of yoke supports 42 and 43, 52 and 53, and 72 and 73 were described as including the pairs of support plates 45a and 45b, 59a and 59b, and 76a and 76b, respectively. However, the present invention is not limited to this configuration, and the support plates can be omitted on one side so that the yokes are supported only on one side, or each pair of support plates can be connected together into a single support plate formed having a U-shaped cross-section to cover each yoke.

Furthermore, the yokes of the cores are not limited to being supported by the yoke supports using fasteners. For example, support flanges for supporting the yokes of the cores may be formed in one or both of each pair of support plates 45a and 45b, 59a and 59b, and 76a and 76b so as to support the yokes. Alternatively, each pair of support plates may be connected to and integrated with an upper and lower pair of connecting plates so as to form a retaining member which retains the yokes between the connecting plates. Moreover, the pairs of support plates 45a and 45b, 59a and 59b, and 76a and 76b are not limited to being formed in an elongated plate shape and can have any shape that makes it possible to support the yokes.

In addition, although in the embodiment above the core 54 of the high-frequency isolation transformer was described as being formed by layering an amorphous magnetic ribbon material, the present invention is not limited to this configuration, and the core 54 can be a laminated core. In this case, the laminated core serving as the core 54 can be fastened to the support plates 59*a* and 59*b* using fasteners such as bolts and nuts, similar to in the first stationary device structure SP1 and the third stationary device structure SP3.

Moreover, although the embodiment above was described as including the reinforcing frames 47, 62, and 78, these reinforcing frames 47, 62, and 78 can be omitted.

Furthermore, although in the embodiment above the stationary induction apparatus according to the present invention was described as being applied to a power converter, the present invention is not limited to this application, and the stationary induction apparatus according to the present invention can be applied to devices which use a plurality of other stationary induction apparatuses such as reactors and transformers.

In addition, although in the embodiment described above the present invention was applied to a power converter for a railway vehicle which collects power from a pantograph installed on top of the vehicle body, the present invention is not limited to this application. The present invention can also be applied to a power converter for a third rail-type railway vehicle which collects power from a third rail via a collector shoe.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A stationary induction apparatus, comprising:
    a plurality of stationary device structures, each including:
        a stationary induction device including:
            a core that has a plurality of magnetic legs and yokes connecting both ends of the plurality of magnetic legs, and
            windings that are respectively wound around the plurality of magnetic legs of the core; and
        a pair of yoke supports that respectively extend along the yokes on both ends of the plurality of magnetic legs and that individually support and are fixed to the respective yokes; and
    a pair of connecting support members to which both ends of the pairs of yoke supports are respectively fixed such that the plurality of stationary device structures are arranged parallel to one another to form airflow paths between the respective stationary induction devices that are disposed adjacent to each other,
    wherein in each of the plurality of stationary device structures, each yoke support of the pairs of yoke supports includes at least one support plate that extends in an elongated direction of the corresponding yoke of the core, contacts a side face of the yoke, and that is parallel to an airflow direction of the airflow paths, and the support plate has formed on both ends thereof attachment flanges which are attached to the pair of connecting support members using fasteners,
    wherein each of the plurality of stationary device structures further comprises a frame-shaped reinforcing frame that surrounds and thereby supports all of the support plates of the pairs of yoke supports from outer sides thereof, and
    wherein the plurality of stationary device structures include a first stationary device structure that has a DC reactor as the stationary induction device therein, a second stationary device structure that has an isolation transformer as the stationary induction device therein, and a third stationary device structure that has a three-phase AC reactor as the stationary induction device therein, the first through third stationary devices being arranged parallel to one another side-by-side in that order.

2. The stationary induction apparatus according to claim 1, wherein in the DC reactor, separate windings are wound around two magnetic legs.

3. The stationary induction apparatus according to claim 1, wherein in the three-phase AC reactor, separate windings are wound around three magnetic legs.

4. A power converter including the stationary induction apparatus according to claim 1.

5. A power converter, comprising:
    the stationary induction apparatus as set forth in claim 1;
    a step-up chopper that includes as a component thereof, the DC reactor in the first stationary induction apparatus;
    a resonant DC-DC converter that includes, as a component thereof, the isolation transformer in the second stationary induction apparatus; and
    a three-phase inverter that includes, as a component thereof, the three-phase AC reactor in the third stationary induction apparatus.

\* \* \* \* \*